April 29, 1924.
A. S. BROWN
SECTIONAL TIRE
Filed March 28, 1923
1,492,509
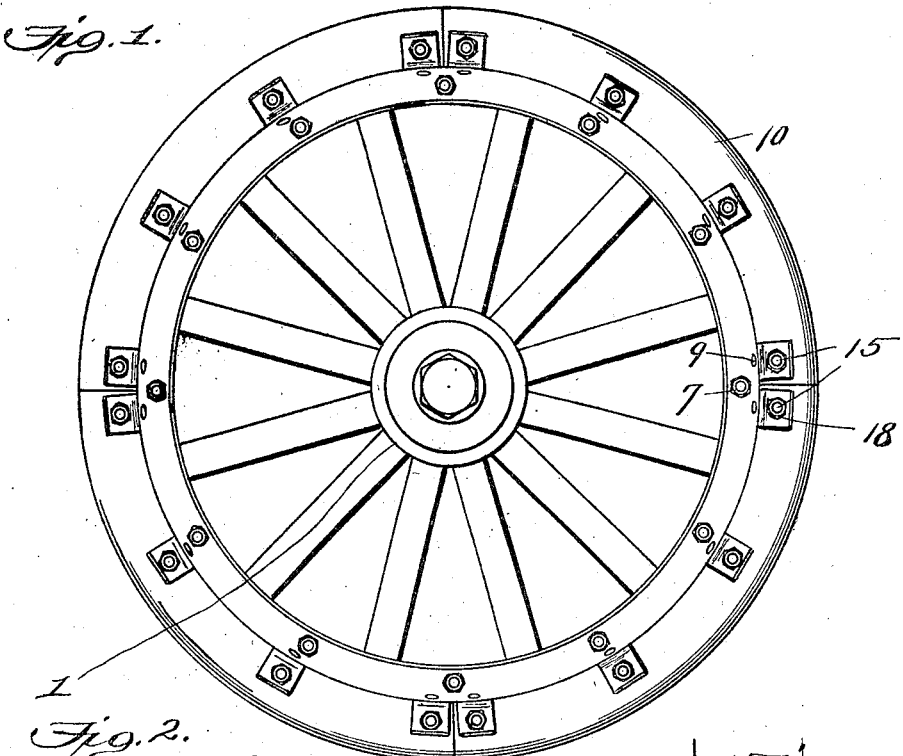
Fig. 1.
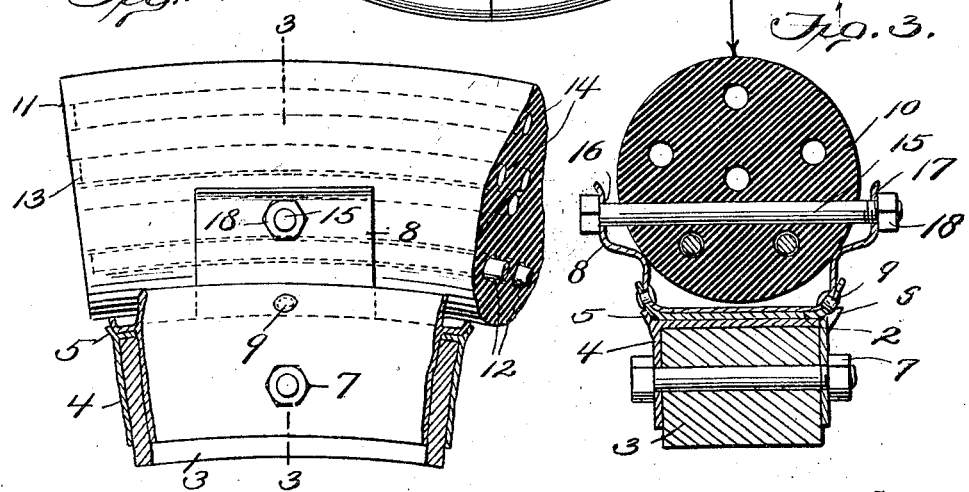
Fig. 2.      Fig. 3.
Inventor
Albert S. Brown
By
Attorney Patented Apr. 29, 1924.

1,492,509

UNITED STATES PATENT OFFICE.

ALBERT S. BROWN, OF OMAHA, NEBRASKA.

SECTIONAL TIRE.

Application filed March 28, 1923. Serial No. 628,355.

*To all whom it may concern:*

Be it known that I, ALBERT S. BROWN, a citizen of the United States, residing at Omaha, in the county of Douglas and State of Nebraska, have invented certain new and useful Improvements in Sectional Tires, of which the following is a specification.

This invention relates to sectional tires for vehicle wheels and particularly to the construction of non-pneumatic resilient tire which may be fitted without difficulty to the demountable rims of auto vehicles.

One of the objects of the invention is the construction of a tire which can be applied to the demountable rim without the necessity of collapsing the latter or otherwise disassembling it in the manner required for the mounting of a pneumatic or other continuous tire.

Another object of the invention is to provide sections of rubber or other resilient material having longitudinal reenforcing wires running therethrough and formed in discontinuous pieces individual to the sections, whereby the latter may be removed in a radial direction from the rim.

A further object of the invention is the provision of spaced holders, which may be permanently carried by the demountable rim, and supporting transverse securing means passing through the tire section outwardly with respect to the reenforcing wires for securely holding the tire in position and preventing tearing of the rubber or other resilient substance by said securing means.

A further object of the invention is the suspending of the tire by said securing means in spaced relation to the rim for the purpose of permitting the tire to yield more readily adjacent its points of anchorage than elsewhere, so as to overcome the excessive wear that would otherwise take place due to the presence of the rigid securing means in the body of the tire.

For the attainment of these ends and the accomplishment of other new and useful objects, as will appear, the invention consists in the features of novelty in the construction, combination and arrangement of the several parts generally shown in the accompanying drawings and described in the specification, but more particularly pointed out in the appended claims.

In the drawings:—

Figure 1 is a view in elevation of a wheel equipped with my improved sectional tire.

Figure 2 is a detail on an enlarged scale, in elevation showing a portion of one of the resilient sections.

Figure 3 is a cross sectional view taken along the line 3—3 of Figure 2.

Referring now in detail to the several figures, the numeral 1 designates a wheel which in the preferred embodiment of my invention is represented as the wheel of an auto vehicle having the demountable rim 2. The wheel 1 includes the felly portion 3 which is shod on one side and on its peripheral surface with the fixed rim 4 having an upturned circumferential flange 5 on one edge thereof. The demountable rim 2 seats upon the fixed rim 4, one side thereof abutting against the flange 5 and the other side being engaged by the rim lugs 6 which are clamped thereagainst by pressure created through tightening of the nuts 7. The construction just described is well known and forms no part of my invention. A pneumatic tire is normally carried within the demountable rim 2 for which my improved sectional tire is a substitution.

In order to adapt the demountable rim 2 for the reception of the sectional tire, it is provided at spaced intervals with a plurality of yoke-shaped tire holders 8, the middle or bow portions of which fit within the demountable rim, said holders being secured to said rim in any suitable manner, for instance by riveting as shown at 9 in Figure 3. The holders thus preferably become a permanent part of the rim.

As shown in Figure 1 the sectional tire consists of a shoe comprising sections 10 of rubber or other resilient material, the number of which is immaterial, a tire of four sections being shown in the illustration. Each section consists of a portion of a cylindrical annulus the ends 11 of which are preferably cut in a plane radial of the vehicle wheel. A plurality of reenforcing wires 12 pass longitudinally through the inner part of each section, said wires terminating substantially at the ends of the section as shown at 13 in Figure 2. The number of wires is immaterial. Said wires preferably lie within tubular channels formed in the tire section and there may be several unoccupied channels 14 of similar nature lying adjacent the tread of the tire and being for the purpose of lightening the tire and adding to its resiliency. The wires 12 are unconnected with the wires of adjacent sections and are prevented from escaping by the abutting relationship of the adjacent ends of the tire sections when the latter are mounted upon the wheel as shown in Figure 1, and the termination of said wires at or adjacent the ends of said sections permit the latter to be removed radially from the wheel for the purpose of replacement without disassembling the demountable rim in the manner which would be necessary were a pneumatic or continuous tire used.

Each tire section extends through a plurality of holders 8, being partially embraced by them, there being preferably one of said holders closely adjacent each end of the section. The section is secured to the holders and to the rim by means of bolts 15 passing transversely therethrough and through aligned apertures 16 and 17 in opposite limbs of the yoke-shaped holders. The bolts 15 pass above the reenforcing wires 14 as clearly shown in Figure 3, said wires acting as a barrier to prevent the tearing of the transverse bolts 15 through the tire under the strain of the tractive thrust transmitted to said tire by the driving means of the vehicle.

One of the important features of my invention is the arrangement of the tire sections in such a way that they are suspended by the bolts 15 in spaced relation to the demountable rim and to the bow portion of the tire holders so that there is normally a clearance between the inner surface of the tire and any other fixed portion of the the wheel or rim construction. The object of this is to render the tire more resilient at points directly above the bolts 15 than at other portions, more effectually to cushion or absorb the road shocks received at these points which would otherwise cause undue wear of the tire above its point of anchorage, occasioned by the presence of the rigid bolts 15 in the body of the tire. This will be readily understood by observing that a load pressure in the direction indicated by the arrow in Figure 3 will be resisted solely by that part of the tire lying between the point of application of said load and the bolt 15, the hole through which said bolt passes being elongated in the direction of application of said force, causing a bodily movement downward of the portion of said tire below said bolt, without compressing the same and therefore without any re-active effort which would tend to resist the yielding of said tire. It is obvious that were the tire normally to make contact with the rigid metallic bow portion of the tire holder 8 the tendency of the tire to yield would be resisted by the resilient pressure of that portion of the tire beneath said bolt causing the material between said bolt and the load to be subjected to a blow of more impactive character. In the absence of some device to lessen the shock at the point of anchorage, the tire in time would become transversely ridged with worn depressions above the bolts 15.

In replacing a section of my improved tire, it is necessary merely to remove the nuts 18 on the end of the bolts 15, withdrawing the latter. The tire section is then removed, another one put in its place and the bolts 15 tightened.

It is obvious that various changes may be made in the details of construction without departing from the invention and it is therefore to be understood that this invention is not to be limited to the specific construction shown and described.

Having described my invention what I claim as new and desire to secure by Letters Patent, is:—

1. A resilient tire for vehicle wheels comprising a sectional shoe of resilient material, the sections thereof each having a reenforcing wire running therethrough terminating adjacent the ends of the sections and independent of the wires in other sections.

2. A resilient sectional tire for vehicle wheels comprising a shoe formed with resilient sections, rigid means passing through each section for securing it to a rim, said means being arranged to provide normally a clearance space between said sections and any rigid structure associated with the rim on which the tire is mounted.

3. In combination a rim, spaced tire holding means fixed to said rim, a tire including resilient sections, rigid means cooperating with said holding means and passing through said sections for securing the latter in spaced relation to said rim.

4. In combination a rim, yoke-shaped tire-holding means fixed to said rim in spaced relation to each other, a tire including resilient sections each retained within a plurality of yoke-shaped holding means, securing means for each section passing transversely through said section and the opposite sides of said yoke-shaped holding means and reenforcing wires running longitudinally through each section below said securing means.

5. In combination a rim, yoke-shaped holding means fixed to said rim in spaced relation to each other, a tire including resilient sections each retained within a plurality of yoke-shaped holding means, securing means for each section passing transversely through said section and the opposite sides of said yoke-shaped holding means and reenforcing wires running longitudinally through each section below said securing means and terminating adjacent the ends of said sections.

In testimony whereof I have hereunto set my hand.

ALBERT S. BROWN.